(12) United States Patent
Hazel et al.

(10) Patent No.: US 7,546,683 B2
(45) Date of Patent: Jun. 16, 2009

(54) TOUCH-UP OF LAYER PAINT OXIDES FOR GAS TURBINE DISKS AND SEALS

(75) Inventors: Brian Thomas Hazel, Cincinnati, OH (US); Eva Zielonka Lanman, Milford, OH (US); Joseph Aloysius Heaney, Middletown, OH (US); Michael James Weimer, Loveland, OH (US)

(73) Assignee: General Electric Company, Schenectady, NY (US)

( * ) Notice: Subject to any disclaimer, the term of this patent is extended or adjusted under 35 U.S.C. 154(b) by 365 days.

(21) Appl. No.: 10/747,458

(22) Filed: Dec. 29, 2003

(65) Prior Publication Data

US 2005/0138805 A1    Jun. 30, 2005

(51) Int. Cl.
*B23P 6/00* (2006.01)
*B23D 19/10* (2006.01)
*B23K 9/04* (2006.01)

(52) U.S. Cl. .................................. 29/889.1; 29/402.18
(58) Field of Classification Search ................. 29/889, 29/889.1, 402.18; 427/419.2
See application file for complete search history.

(56) References Cited

U.S. PATENT DOCUMENTS

| | | | |
|---|---|---|---|
| 3,246,249 A | 4/1966 | Collins, Jr. | |
| 3,248,250 A | 4/1966 | Collins, Jr. | |
| 3,248,251 A | 4/1966 | Allen | |
| 4,097,287 A | 6/1978 | Ito et al. | |
| 4,267,210 A | 5/1981 | Yajima et al. | |
| 4,319,924 A * | 3/1982 | Collins et al. ............ | 106/14.12 |
| 4,650,395 A | 3/1987 | Weidner | |

(Continued)

FOREIGN PATENT DOCUMENTS

EP    1 088 908 A2    4/2001

(Continued)

OTHER PUBLICATIONS

Sermatech International, SermaLoy J Product Information, <<http://www.sermatechinternational.com/coating/prod_sermaloy.html> > [May 10, 2006].*

(Continued)

*Primary Examiner*—David P Bryant
*Assistant Examiner*—Christopher M Koehler
(74) *Attorney, Agent, or Firm*—McNees Wallace & Nurick, LLC

(57) ABSTRACT

The present invention is a process for applying oxide paint as a touch-up paint for an oxide-based corrosion inhibiting coating with at least one imperfection region. Such oxide-based corrosion inhibiting coatings are applied on superalloy components used for moderately high temperature applications, such as the superalloy components found in the high-pressure turbine (HPT) section of a gas turbine engine, including turbine disks and seals. However, during the application of oxide-based corrosion inhibiting coatings, imperfection regions sometimes occur, exposing the superalloy substrate beneath the oxide-based corrosion inhibiting coating. Such imperfection regions can include a spalled region, a scratched region, a chipped region, an uncoated region, or combinations thereof. The process of the present invention is useful where aircraft engine components have been treated with a corrosion inhibiting three-layer paint oxide system comprising chromia and alumina, but where a small imperfection region or regions within the layer oxide system are present after initial manufacture, refurbishment, or repair of the component.

21 Claims, 1 Drawing Sheet

U.S. PATENT DOCUMENTS

| | | | |
|---|---|---|---|
| 4,671,997 A | 6/1987 | Galasso et al. | |
| 4,724,172 A | 2/1988 | Mosser et al. | |
| 4,863,516 A | 9/1989 | Mosser et al. | |
| 4,975,330 A | 12/1990 | Mosser | |
| 5,120,613 A * | 6/1992 | Basler et al. | 428/653 |
| 5,162,460 A | 11/1992 | Popa et al. | |
| 5,437,737 A * | 8/1995 | Draghi et al. | 148/23 |
| 5,466,280 A | 11/1995 | Lee et al. | |
| 5,547,770 A * | 8/1996 | Meelu et al. | 428/678 |
| 5,898,994 A * | 5/1999 | Miller et al. | 29/889.1 |
| 5,905,104 A | 5/1999 | Eklund et al. | |
| 5,968,240 A | 10/1999 | Myers et al. | |
| 5,985,368 A | 11/1999 | Sangeeta et al. | |
| 6,057,047 A | 5/2000 | Maloney | |
| 6,074,464 A | 6/2000 | Eddinger et al. | |
| 6,126,758 A * | 10/2000 | Meelu et al. | 148/258 |
| 6,224,657 B1 | 5/2001 | Myers et al. | |
| 6,299,971 B1 | 10/2001 | Maloney | |
| 6,333,121 B1 | 12/2001 | Walston et al. | |
| 6,365,236 B1 | 4/2002 | Maloney | |
| 6,428,630 B1 | 8/2002 | Mor et al. | |
| 6,569,492 B2 * | 5/2003 | Femihough et al. | 427/142 |
| 6,575,703 B2 | 6/2003 | Simeone et al. | |
| 6,605,364 B1 * | 8/2003 | Conner et al. | 428/469 |
| 6,893,737 B2 * | 5/2005 | Ackermann et al. | 428/650 |
| 7,008,522 B2 * | 3/2006 | Boucard et al. | 205/115 |
| 2002/0048683 A1 | 4/2002 | Walston et al. | |
| 2002/0055004 A1 | 5/2002 | Walston et al. | |
| 2002/0172837 A1 | 11/2002 | Allen et al. | |
| 2003/0221315 A1 * | 12/2003 | Baumann et al. | 29/889.1 |

FOREIGN PATENT DOCUMENTS

| | | |
|---|---|---|
| EP | 1 197 585 A2 | 4/2002 |
| EP | 1 251 191 A1 | 10/2002 |
| EP | 1 371 812 A1 | 12/2003 |

OTHER PUBLICATIONS

Mid-Mountain Materials, Inc., Thermoseal Thermal Coatings, <www.mid-mountain.com/products/cercoat.html>, retrieved from the internet via www.archive.org on Oct. 31, 2006, publishing date Mar. 31, 2001.*

* cited by examiner

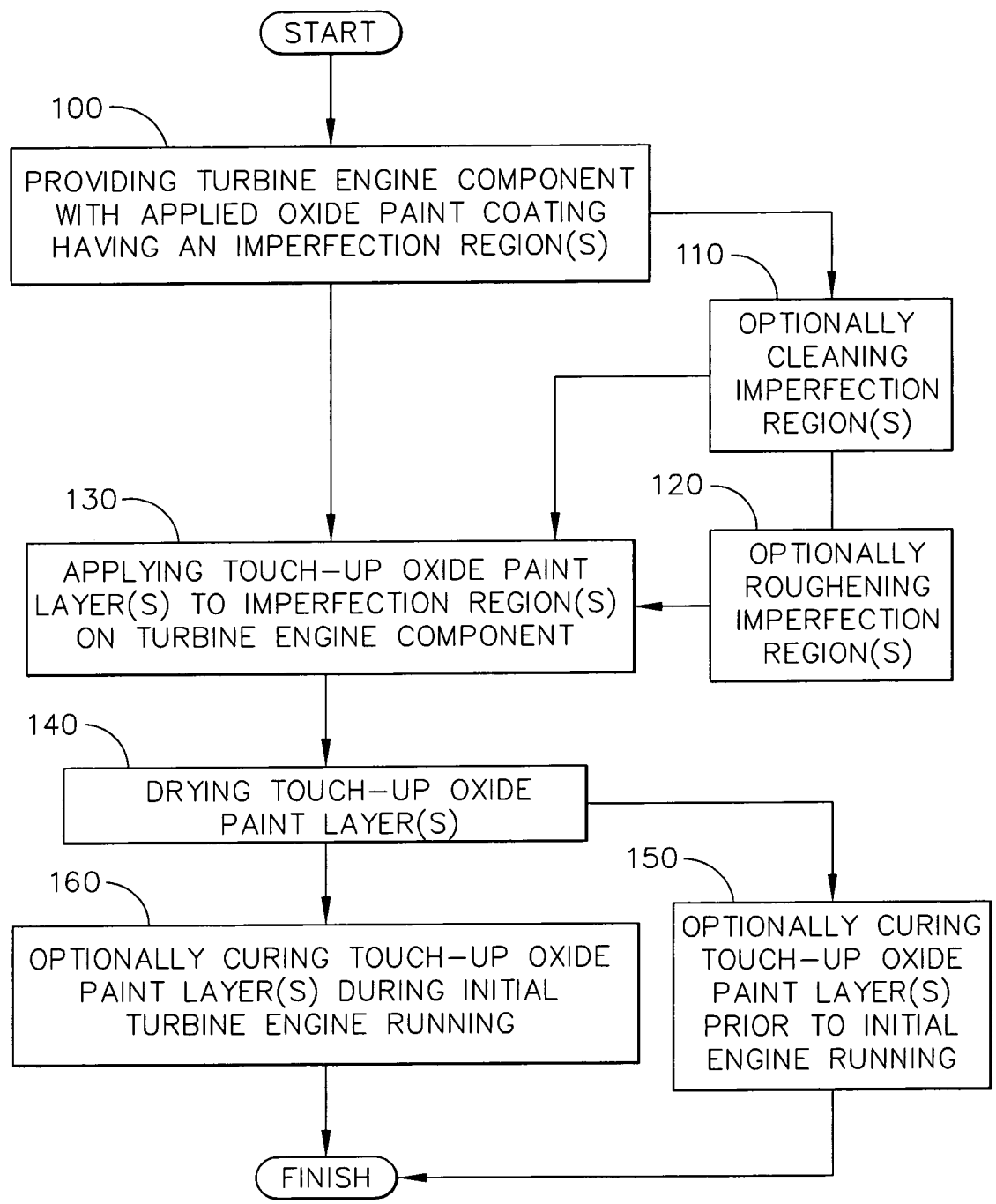

TOUCH-UP OF LAYER PAINT OXIDES FOR GAS TURBINE DISKS AND SEALS

FIELD OF THE INVENTION

The present invention relates to gas turbine engines and, more particularly, to the protection of turbine disks and seals against oxidation and corrosion.

BACKGROUND OF THE INVENTION

In an aircraft gas turbine (jet) engine, air is drawn into the front of the engine compressed by a shaft-mounted compressor, and mixed with fuel. The mixture is burned, and the hot combustion gases are passed through a turbine mounted on the same shaft. The flow of combustion gas turns the turbine, which turns the shaft and provides power to the compressor and to the fan. In a more complex version of the gas-turbine engine, the compressor and a high-pressure turbine are mounted on one shaft having a first set of turbines, and the fan and a low-pressure turbine are mounted on a separate shaft having a second set of turbines. The hot exhaust gases and the air propelled by the fan flow from the back of the engine, driving it and the aircraft forward. The hotter the combustion and exhaust gases, the more efficient the operation of the jet engine. There is thus an incentive to raise the combustion-gas temperature.

The turbine (sometimes termed a "turbine rotor") includes one or more turbine disks, a number of turbine blades mounted to the turbine disks and extending radially outwardly therefrom into the combustion-gas flow path, and rotating seals that prevent the hot combustion gases from contacting the turbine shaft and related components. The materials used in the turbine limit the maximum operating temperature of the combustion gas. Great efforts have been made to increase the temperature capabilities of the turbine blades, resulting in increasing combustion as operating temperatures and increased engine efficiency.

As the maximum operating temperature of the combustion gas increases, the turbine disk and seals are subjected to higher temperatures in the combustion and bleed gas environment. As a result, oxidation and corrosion of the turbine disk and seals have become of greater concern. Alkaline sulfate deposits resulting from the ingested dirt and the sulfur in the combustion gas are a major source of the corrosion, but other elements in the aggressive combustion and bleed gas environment may also accelerate the corrosion. The oxidation and corrosion damage may lead to premature removal and replacement of the turbine disk and seals unless the damage is reduced or repaired.

The turbine disks and seals for use at the highest operating temperatures are made of nickel-base superalloys selected for good toughness and fatigue resistance. These superalloys are selected for their mechanical properties. They have some resistance to oxidation and corrosion damage, but that resistance is not sufficient to protect them at the operating temperatures that are now being reached.

One corrosion resistant coating, which has been developed for use with turbine disks and seals, is a three-layer oxide based paint system that may be applied to the corrosion susceptible areas of turbine disks and seals. This three-layer oxide based paint coating system comprises alumina and chromia particles, which are oxides of metals that are found in the superalloy substrate. Such a coating system does not adversely affect the fatigue life of the turbine disks and seals and greatly increases the corrosion resistance of the component to which it is applied. However, during the application of such paint systems during initial manufacture of aircraft engine components, small coating imperfection regions sometimes develop, exposing the superalloy substrate. Placing an aircraft engine into service with such coating imperfections present on the component would open up the component under these areas of imperfection to corrosion. One solution is to strip all of the coating off of the component and reapply the coating. However, such a solution is expensive and time consuming.

What is needed is a method of applying touch-up oxide paint onto the coating imperfections of layer paint oxide coating systems on turbine disks and seals. Such touch-up oxide paint should be able to be applied after initial manufacture and inhibit corrosion from occurring between planned engine overhauls, which generally occur approximately every 3000 cycles. In addition, such application of touch-up oxide paint should not affect the low cycle fatigue (LCF) life, readily adhere to a superalloy substrate, and function effectively to 1400° F. (760° C.). This need extends to other components of the gas turbine engine with layer paint oxide coating systems as well. The present invention fulfills these needs, and further provides related advantages.

SUMMARY OF THE INVENTION

The present invention is a process for applying oxide paint as a touch-up paint for an oxide-based corrosion inhibiting coating with at least one imperfection region. Such oxide-based corrosion inhibiting coatings are applied on superalloy components used for moderately high temperature applications, such as the superalloy components found in the high-pressure turbine (HPT) section of a gas turbine engine, including turbine disks and seals. However, during the application of oxide-based corrosion inhibiting coatings, imperfection regions sometimes occur, exposing the superalloy substrate beneath the oxide-based corrosion inhibiting coating. Such imperfection regions can include a spalled region, a scratched region, a chipped region, an uncoated region, or combinations thereof. The process of the present invention is useful where aircraft engine components have been treated with a corrosion inhibiting three-layer paint oxide system comprising chromia and alumina, but where a small imperfection region or regions within the layer oxide system are present after initial manufacture, refurbishment, or repair of the component.

The method of the present invention includes providing a turbine engine component comprising an iron-based, nickel-based, and/or cobalt based superalloy substrate, to which a paint oxide system comprising a plurality of layers and comprising chromia and alumina has been applied, but where at least one small imperfection region, which exposes the surface of the superalloy substrate, is present within the paint oxide system region. After optionally cleaning the imperfection region(s) with isopropyl alcohol or equivalent cleaner solvent, if required, the imperfection surface may be lightly roughened to a surface roughness in the range of about 10 microinches to about 100 microinches $R_a$. A preselected number of layers of touch-up oxide paint are applied to the surface of the imperfection region(s). The paint comprises alumina particles as a particulate solid in the paint, and may also comprise oxide particles selected from the group consisting of chromia, silica, titania, zirconia, tantala particles, and combinations thereof, a carrier material, typically an evaporable solvent, and a binder selected from the group consisting of silicate, silicone, chromate phosphate, siloxane, and combinations thereof. Suitable binders are described in U.S. Pat. Nos. 4,319,924; 3,248,251; 3,248,250; and 3,248,249, all of which are incorporated herein by reference.

The application of the layer(s) may be performed by hand or by spraying the layer(s) onto the imperfection region(s). The number of layers of the touch-up paint can be of one layer or more than one layer, as the thickness of the touch-up oxide paint layer(s) should be about equal to the thickness of the original layered oxide paint system.

The layer(s) is then allowed to dry at room temperature for a preselected period of time, generally in the range of about one hour to about ten hours, depending on the solvent and the binder in the touch-up oxide paint, so that the layer(s) is dry enough to prevent damage to the layer(s) prior to curing the layer(s). In some cases, depending on the nature of the binder, such as, for example a chromate binder, the use of a heat gun may be required to render the layer(s) sufficiently dry to handle. In such instances, a heat gun, producing heated air having a temperature sufficient to drive off the evaporable solvent and to dry the binder, will need to be used on the layer(s) in the range of about 15 minutes to about 4 hours. The heat gun therefore heats the layer(s) to a temperature sufficient to drive off the evaporable solvent and to dry the binder. As is known in the art, a higher heat gun temperature will require a shorter treatment time, while a lower heat gun temperature will require a longer treatment time. The heat gun optionally may cure the binder. The layer may also be heated using heat lamps or any other convenient heating method. The touch-up paint layer(s) need only be dried, but can be fully cured, before engine build-up. Curing of dried only repairs will occur during initial engine operation where engine components reach temperatures sufficiently high to fully cure the touch up.

The present invention is also an aircraft engine component such as a turbine disk or turbine seal, that has been treated with the method of the present invention, wherein at least a portion of the component was initially manufactured with a corrosion inhibiting layered paint oxide system comprising a plurality of layers and comprising alumina and chromia, with an imperfection present in the layered paint oxide system. A touch-up paint comprising alumina is provided and a layer of the touch-up paint is applied to the imperfection region. The layer of touch-up paint is then dried and cured.

The present invention is also turbine engine component comprising a superalloy component, the superalloy component coated with a layered paint oxide system, the component further including imperfections in the layered paint oxide system exposing the superalloy component, wherein the imperfections are further coated with a touch-up paint comprising at least alumina particles.

An advantage of the present invention is a significant labor, capital and materials cost reduction as stripping and reapplying a layered chromia and alumina coating is no longer required due to the touch-up method of the present invention.

Another advantage of the present invention is that the process is more environmentally friendly than current practice since heavy metal based powder waste such as alumina powder waste and chromia powder waste is reduced.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 is a process flow chart illustrating the application of the touch-up oxide paint of the present invention.

DETAILED DESCRIPTION OF THE INVENTION

Referring now to FIG. 1 there is shown the method of the present invention for applying a touch-up oxide paint to an aircraft engine component substrate to which a three-layer paint oxide system comprising chromia and alumina has been applied, but which system contains an imperfection region(s).

The initial step 100 of the process is the provision of a turbine engine component with an applied three-layer paint oxide system comprising alumina and chromia, having at least one imperfection region. The component comprises a nickel-based, iron-based, and/or cobalt-based superalloy substrate. The three-layer paint oxide system is present on at least a portion of a surface of the component substrate. The thickness of the three-layer paint oxide system is in the range of about 0.0005 inch to about 0.0025 inch. The three-layer oxide paint system may comprise an alumina containing layer, a chromia containing layer and a magnesium phosphate layer. The imperfection in the three-layer paint oxide system exposes the nickel-based, iron-based, and/or cobalt-based superalloy substrate beneath the three-layer paint oxide system to corrosion attack. The imperfection region may be a spalled region, a scratched region, a chipped region, and/or an uncoated region. A plurality of such regions may be present on the substrate, but should not be continuous. The optional next step 110 of the process is cleaning the imperfection region(s), if required, with isopropyl alcohol, a solvent with similar properties, or combinations thereof to remove any dirt, particles, films and/or other contaminants, referred to herein as "extraneous material" that may adversely affect adhesion of the touch-up paint layer to the imperfection region(s). The optional next step 120 of the process is roughening the imperfection region(s) to a surface roughness in the range of about 10 microinches to about 100 microinches $R_a$. In a preferred optional embodiment, the optional next step 120 of the process is roughening the imperfection region(s) to a surface roughness in the range of about 20 microinches to about 60 microinches $R_a$. Such a surface roughness may be achieved using any means known in the art, such as, for example rubbing the imperfection region(s) with 320 mesh aluminum oxide sand paper or an equivalent sand paper.

The next step 130 of the process is applying a preselected number of layers of touch-up oxide paint to the surface of the imperfection region(s). The touch-up oxide paint comprises alumina particles as a particulate solid in the paint and may also comprise oxide particles selected from the group consisting of chromia, silica, titania, zirconia, tantala particles, and combinations thereof, a carrier material, typically an evaporable solvent, and a binder selected from the group consisting of silicate, silicone, chromate phosphate, siloxane, and combinations thereof. The oxide particles in the paint should have diameters smaller than the overall desired coating thickness. The oxide particles preferably have a particle size diameter distribution in the range of about 0.1 microns to about 25 microns, with a particle size diameter distribution in the range of about 0.1 microns to about 10 microns being the most preferred embodiment. The oxides in the paint preferably comprise a volume percentage of total solids in the paint in the range of about 20 percent to about 70 percent by volume, with a volume percentage of total solids in the paint in the range of about 46 percent to about 52 percent being the most preferred embodiment. The application of the layer(s) may be performed by hand brushing or by spraying the layer(s) onto the imperfection region(s). The number of layers of the touch-up paint can be one layer or more layers, as the thickness of the touch-up oxide paint layer(s) should be about equal to the thickness of the original three-layer oxide paint system, preferably in the range of about 0.0005 inch to about 0.0025 inch. The dried thickness of the touch-up oxide paint layer(s) is preferably in the range of about 0.0010 inch to about 0.0015 inch. The most preferred method of application is two hand brushed layers having a thickness in the range of about 0.0005 inch to about 0.0006 inch for each layer, with a total dried layer thickness in the range of about 0.0010 inch to about 0.0012 inch.

The next step 140 of the invention is drying the touch-up oxide paint layer(s) preferably at room temperature, by exposing the oxide paint layer(s) to ambient air for a preselected period of time, generally in the range of about one hour to about ten hours, depending on the solvent and the binder in the touch-up oxide paint, so that the layer(s) is dry enough to prevent damage to the layer(s), during engine manufacture, prior to curing the layer(s). Such drying usually entails evaporation of a substantial portion of the solvent. In some cases, depending on the nature of the binder, such as, for example a chromate binder, the use of a heat gun may be required to render the layer(s) sufficiently dry to handle. In such instances, a heat gun, producing heated air having a temperature sufficient to drive off the evaporable solvent and to dry the binder, and preferably at a temperature of about 300° F. (150° C.), will need to be used on the layer(s) for a time of about 15 minutes to about 4 hours. As is well known in the art, a higher heat gun temperature will require a shorter treatment time, while a lower heat gun temperature will require a longer treatment time. The heat gun optionally may cure the binder. As is known in the art, a higher heat gun temperature will require a shorter treatment time, while a lower heat gun temperature will require a longer treatment time. In a preferred embodiment of the present invention, the touch-up paint comprises alumina, chromia, a siloxane binder, and an evaporable solvent. While the siloxane binder will dry at ambient conditions in approximately two hours to a tack-free handleable coating, the binder requires a heat cure at a temperature of about 400° F. (205° C.) to about 500° F. (260° C.) to achieve the performance necessary in the present invention.

The optional final step 150 of the invention is curing the touch-up oxide paint layer(s) by heating the paint layer(s) to a temperature in the range of about 300° F. (150° C.) to about 1000° F. (540° C.) for a period of time in the range of about 10 minutes to about 4 hours, preferably to a temperature of about 650° F. (345° C.) for about 30 minutes. The touch-up paint layer(s) are cured as required by the specific paint formulation prior to initial engine running. As is well known in the art, a higher cure temperature will require a shorter treatment time, while a lower cure temperature will require a longer treatment time. The second and preferred optional final step 160 of the invention is curing the touch-up layer(s) during initial turbine engine running. The operating temperature of the coated components is typically in the range of about 1000° F. (540° C.) to about 1400° F. (760° C.) and at such temperatures the applied layer(s) will cure in less than about 30 minutes.

The final cured oxide touch-up coating provides corrosion protection to the underlying superalloy component substrate, does not adversely impact the LCF of the superalloy component, adheres to the superalloy component substrate, and is temperature capable up to about 1400° F. (760° C.). Above a temperature of about 1400° F. (760° C.), coating adhesion decreases and certain silicate binders become unstable in contact with the base alloys.

The present invention also comprises an aircraft engine component, wherein the component is a turbine disk or turbine seal comprising an iron-based superalloy, a nickel-based superalloy, or a cobalt-based superalloy, that has been treated with the touch-up paint of the present invention, wherein at least a portion of the component was initially manufactured with an a corrosion inhibiting three-layer paint oxide system comprising alumina and chromia, with an imperfection present in the three-layer paint oxide system. A touch-up paint comprising at least alumina particles is provided and a layer of the touch-up paint is applied to the imperfection region. The tough up paint may also comprise oxide particles selected from the group consisting of chromia, silica, titania, zirconia, tantala particles, and combinations thereof. The layer of touch-up paint is then dried and cured.

In an investigation leading up to this invention, four different touch-up paints formulations were prepared and tested using a corrosion test and a low cycle fatigue LCF test. The first testing formulation comprised alumina particles, titania particles, a potassium silicate binder, and an evaporable solvent. The second testing formulation comprised alumina particles, a hexavalent chromium phosphate binder, and an evaporable solvent. The third testing formulation comprised alumina particles, chromia particles, a siloxane binder, and an evaporable solvent. The fourth testing formulation comprised alumina particles, an alkaline inorganic silicate binder, and an evaporable solvent.

A corrosion test, which simulates the morphology of corrosion observed in field run hardware, was run on a nickel-based superalloy substrate samples using a bar sample as a control. Several nickel-based superalloy substrates samples, which had been subjected to 320 grit blast, were prepared and coated with a layer of each of the four testing formulations listed above. Each testing formulation on each sample was cured prior to the corrosion test. The first testing formulation and the second testing formulation demonstrated a corrosion resistance that was over 5 times better than corrosion resistance of the bare substrate. The third testing formulation and the fourth testing formulation demonstrated a corrosion resistance that was about 2.5 times better than the corrosion resistance of the bare substrate as determined by substrate material attack.

For the LCF test, three LCF bars per testing coating were prepared and one layer of each touch-up paint formulation was applied to each LCF bar on the gage section of the bar. The bars were tested at 1200° F. (650° C.), 100 ksi, and an A ratio of 1.0 in strain control. The bars were all compared to the original LCF testing data of the original nickel-based superalloy substrate. No LCF debit was seen with the bars that were coated with touch-up formulations comprising siloxane or chromium phosphate binders. Bars that were coated with touch-up formulations comprising potassium silicate binders did exhibit cation reactions with the substrate at 1200° F. (650° C.), resulting in about a 90% reduction in LCF life when such binders were used.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for repairing an imperfection in a corrosion-inhibiting layer paint oxide system comprising a plurality of layers on a turbine engine component, the method comprising the steps of:
   providing a turbine engine component comprising a superalloy substrate, wherein at least a portion of the substrate has been treated with a corrosion inhibiting paint oxide system comprising aluminia and chromia, wherein an imperfection region is present on the system exposing the superalloy substrate beneath the system;
   providing a touch-up paint comprising alumina particles, an evaporable solvent, and a binder selected from the group consisting of silicate, silicone, chromate phosphate, siloxane, and combinations thereof;
   applying a layer of the touch-up paint to the imperfection region;
   drying the layer of touch-up paint; and
   curing the layer of touch-up paint at a temperature up to about 1000° F.;
   wherein the touch-up paint further comprises additional oxide particles selected from the group consisting of chromia, silica, titania, zirconia, tantala, and combinations thereof.

2. The method of claim 1, further comprising the step of cleaning the imperfection region to remove extraneous materials that may adversely affect adhesion of the touch-up paint after the step of providing an aircraft engine component.

3. The method of claim 2, further comprising the step of roughening the imperfection region after the step of cleaning the imperfection region.

4. The method of claim 3, wherein the step of roughening is performed with sand paper.

5. The method of claim 3, wherein the step of roughening roughens the imperfection region to a surface roughness in the range of about 10 microinches to about 100 microinches.

6. The method of claim 5, wherein the step of roughening roughens the imperfection region to a surface roughness in the range of about 20 microinches to about 60 microinches.

7. The method of claim 1, further comprising the step of roughening the imperfection region after the step of providing a turbine engine component.

8. The method of claim 1, wherein the step of drying is performed with a heat gun, wherein the heat gun heats the layer to a temperature sufficient to drive off the evaporable solvent and to dry the binder for a period of time of about 15 minutes to about 4 hours.

9. The method of claim 1, wherein the oxide particles have a diameter in the range of about 0.1 microns to about 25 microns and wherein the oxide particles comprise a volume percentage of total solids in the paint in the range of about 20 percent by volume to about 70 percent by volume.

10. The method of claim 9, wherein the oxide particles have a diameter in the range of about 0.1 microns to about 10 microns and wherein the oxide particles comprise a volume percentage of total solids in the paint in the range of about 46 percent by volume to about 52 percent by volume 11. The method of claim 1, wherein two layers of touch-up paint are applied to the imperfection region by brushing.

12. The method of claim 11, wherein the corrosion inhibiting paint oxide system comprises a three-layer paint oxide system having a thickness of about 0.0005 inch to about 0.0025 inch.

13. The method of claim 1, wherein there are a plurality of imperfection regions and a layer of touch-up paint is applied to each imperfection region, wherein each layer of touch-up paint is dried, and wherein each layer of touch-up paint is cured.

14. ) The method of claim 1, wherein the cured layer of touch-up paint is operable up to a temperature of about 1400° F. (760° C.).

15. The method of claim 1, wherein the method of repairing is performed after initial manufacture of the component 16. The method of claim 1, wherein the corrosion inhibiting paint oxide system is a three-layer oxide paint system comprising an alumina containing layer, a chromia containing layer and a magnesium phosphate layer.

17. The method of claim 1, wherein the turbine engine component is a turbine disk.

18. The method of claim 1, wherein the turbine engine component is a turbine seal.

19. The method of claim 1, wherein the turbine engine component is a compressor disk.

20. The method of claim 1, wherein the turbine engine component is a compressor seal.

21. The method of claim 1, wherein the binder is selected from the group consisting of chromate phosphate, siloxane, and combinations thereof.

* * * * *